US011301423B2

(12) United States Patent
Peterke (10) Patent No.: US 11,301,423 B2
(45) Date of Patent: Apr. 12, 2022

(54) SYSTEM AND METHOD FOR MANAGING A FILE CACHE FOR A CLIENT APPLICATION (71) Applicant: MZ IP Holdings, LLC, Palo Alto, CA (US)

(72) Inventor: Detmar Peterke, Pleasanton, CA (US)

(73) Assignee: MZ IP Holdings, LLC, Palo Alto, CA (US)

( * ) Notice: Subject to any disclaimer, the term of this patent is extended or adjusted under 35 U.S.C. 154(b) by 495 days.

(21) Appl. No.: 15/990,964

(22) Filed: May 29, 2018

(65) Prior Publication Data
US 2018/0357252 A1  Dec. 13, 2018

Related U.S. Application Data (60) Provisional application No. 62/516,935, filed on Jun. 8, 2017.

(51) Int. Cl.
*G06F 16/00* (2019.01)
*G06F 16/172* (2019.01)
(Continued)

(52) U.S. Cl.
CPC ......... *G06F 16/172* (2019.01); *G06F 12/126* (2013.01); *G06F 16/122* (2019.01); *G06F 16/162* (2019.01); *G06F 16/1824* (2019.01)

(58) Field of Classification Search
CPC ......... G06F 17/30233; G06F 17/30132; G06F 17/30067; G06F 17/30283;
(Continued)

(56) References Cited

U.S. PATENT DOCUMENTS 5,390,318 A * 2/1995 Ramakrishnan ...... G06F 16/902
711/158
6,449,695 B1   9/2002 Bereznyi et al.
(Continued)

FOREIGN PATENT DOCUMENTS

CN        106604043 A    4/2017

OTHER PUBLICATIONS

Rowstron, Antony, and Peter Druschel. "Storage management and caching in PAST, a large-scale, persistent peer-to-peer storage utility." Proceedings of the eighteenth ACM symposium on Operating systems principles. 2001.*
(Continued)

*Primary Examiner* — Nan Hutton
(74) *Attorney, Agent, or Firm* — Goodwin Procter LLP (57) ABSTRACT A method, a system, and an article are provided for managing a file cache for a client application. An example computer-implemented method can include: storing a plurality of files in a memory on a client device for a client application; identifying a first portion of the files in the memory as having been used during a previous run of the client application; receiving, from at least one server, one or more lists of files to be used during a current run of the client application; identifying a second portion of the files in the memory as not being included in at least one of the first portion and the one or more lists of files from the at least one server; and removing, from the memory, at least a subset of the second portion of the files during the current run of the client application.

20 Claims, 4 Drawing Sheets (51) Int. Cl.
*G06F 16/11* (2019.01)
*G06F 16/16* (2019.01)
*G06F 16/182* (2019.01)
*G06F 12/126* (2016.01)

(58) Field of Classification Search
CPC ......... G06F 17/30088; G06F 17/30144; G06F 17/30194; G06F 17/3048; G06F 17/30902; G06F 17/30091; G06F 17/30165; G06F 16/27; G06F 16/178; G06F 16/172; G06F 16/1727; G06F 16/162; G06F 16/1824; G06F 16/122; G06F 12/126
See application file for complete search history.

(56) References Cited

U.S. PATENT DOCUMENTS

| | | |
|---|---|---|
| 9,208,089 B2 | 12/2015 | Accapadi et al. |
| 2015/0134913 A1* | 5/2015 | Huang ................ G06F 12/0833 711/135 |
| 2016/0267020 A1 | 9/2016 | Wang et al. |

OTHER PUBLICATIONS

Chen, Zhifeng, Yuanyuan Zhou, and Kai Li. "Eviction-based Cache Placement for Storage Caches." USENIX Annual Technical Conference, General Track. 2003.*
Int'l Search Report and Written Opinion of the ISA/EP in PCT/US2018/034839; dated Aug. 29, 2018; 14 pgs.

\* cited by examiner

SYSTEM AND METHOD FOR MANAGING A FILE CACHE FOR A CLIENT APPLICATION

CROSS-REFERENCE TO RELATED APPLICATIONS

This application claims the benefit of U.S. Provisional Patent Application No. 62/516,935, filed Jun. 8, 2017, the entire contents of which are incorporated by reference herein.

BACKGROUND

The present disclosure relates to client applications and, in certain examples, to systems and methods for managing file caches for client applications.

When a client application is running on a client device (e.g., a mobile phone or tablet computer), a server can alert the client application about groups of file assets that the client application will use. These groups of assets can be or include, for example, data for images, videos, audio, text, graphical user interfaces, new features, new events, etc. The client application can download the assets from the server, as needed, and can present the assets or portions thereof to the user. The client application can also store the assets in a file cache on the client device for later retrieval. Without proper management, however, the file cache can accumulate old or obsolete files and/or can become excessive in size. This can take up valuable storage space on the client device and make it difficult to retrieve desired files from the file cache.

SUMMARY

In general, the subject matter of this disclosure relates to systems and methods for managing one or more file caches for a client application (e.g., a software application running on a client device). Files for the client application are stored in memory on the client device. At the start of a new run of the client device, a portion of the files that were used during a previous run (e.g., the immediately preceding run) are assigned to a keep set. One or more lists of files to be used during the new run are received from one or more server computers. Files that are not in the keep set and are not included in the one or more lists from the server computers are assigned to a delete set. During the new run, a clean operation is performed to remove from memory at least a portion of the files in the delete set.

Advantageously, the systems and methods described herein are able to achieve an efficient management of a file cache for a client application. Files that are important (e.g., have been used recently) can be retained and used during subsequent runs of the client application, thereby avoiding repeated downloads. Other, less important or unused files can be removed from the file cache. This prevents the file cache from collecting old or obsolete files and/or from becoming excessive in size. The approach can also allow for some advantages gained from multithreading, though multithreading is not necessarily required. Additionally or alternatively, the approach is robust in that it can recover from corrupted or truncated files in the cache and/or can be readily implemented to replace a cache management system that was used in an older version of the client application. Further, the approach can avoid removing files from the cache based on timestamps, which can be inaccurate and/or can provide little indication of the importance of a stored file.

In one aspect, the subject matter described in this specification relates to a computer-implemented method. The method includes: storing a plurality of files in a memory on a client device for a client application; identifying a first portion of the files in the memory as having been used during a previous run of the client application; receiving, from at least one server, one or more lists of files to be used during a current run of the client application; identifying a second portion of the files in the memory as not being included in at least one of the first portion and the one or more lists of files from the at least one server; and removing, from the memory, at least a subset of the second portion of the files during the current run of the client application.

In certain examples, the plurality of files can be stored in at least one cache folder, and each cache folder in the at least one cache folder can correspond to a respective server in the at least one server. Identifying the first portion can include retrieving, from the memory, a history file that lists the files used during the previous run. The method can include updating the history file to list the files used during the current run of the client application. Alternatively or additionally, the method can include using the updated history file to identify the first portion of the files during a subsequent run of the client application.

In some implementations, the second portion can include files that were not used during the previous run and will not be used during the current run. Removing from the memory can include deleting files from the memory up to a predetermined maximum number of files, wherein the maximum number is less than or equal to a number of files included in the second portion. The method can include obtaining each file identified in the one or more lists of files for use during the current run of the client application. Obtaining each file can include determining if the file is stored in the memory. Obtaining each file can also include one of: retrieving the file from the memory if the file is stored in the memory; and downloading the file from the at least one server if the file is not stored in the memory.

In another aspect, the subject matter described in this specification relates to a system having one or more computer processors programmed to perform operations including: storing a plurality of files in a memory on a client device for a client application; identifying a first portion of the files in the memory as having been used during a previous run of the client application; receiving, from at least one server, one or more lists of files to be used during a current run of the client application; identifying a second portion of the files in the memory as not being included in at least one of the first portion and the one or more lists of files from the at least one server; and removing, from the memory, at least a subset of the second portion of the files during the current run of the client application.

In various examples, the plurality of files can be stored in at least one cache folder, and each cache folder in the at least one cache folder can correspond to a respective server in the at least one server. Identifying the first portion can include retrieving, from the memory, a history file that lists the files used during the previous run. The operations can include updating the history file to list the files used during the current run of the client application. Alternatively or additionally, the operations can include using the updated history file to identify the first portion of the files during a subsequent run of the client application.

In certain implementations, the second portion can include files that were not used during the previous run and will not be used during the current run. Removing from the memory can include deleting files from the memory up to a predetermined maximum number of files, wherein the maximum number is less than or equal to a number of files included in the second portion. The operations can include obtaining each file identified in the one or more lists of files for use during the current run of the client application. Obtaining each file can include determining if the file is stored in the memory. Obtaining each file can also include one of: retrieving the file from the memory if the file is stored in the memory; and downloading the file from the at least one server if the file is not stored in the memory.

In another aspect, the subject matter described in this specification relates to an article. The article includes a non-transitory computer-readable medium having instructions stored thereon that, when executed by one or more computer processors, cause the computer processors to perform operations including: storing a plurality of files in a memory on a client device for a client application; identifying a first portion of the files in the memory as having been used during a previous run of the client application; receiving, from at least one server, one or more lists of files to be used during a current run of the client application; identifying a second portion of the files in the memory as not being included in at least one of the first portion and the one or more lists of files from the at least one server; and removing, from the memory, at least a subset of the second portion of the files during the current run of the client application.

Elements of embodiments described with respect to a given aspect of the invention can be used in various embodiments of another aspect of the invention. For example, it is contemplated that features of dependent claims depending from one independent claim can be used in apparatus, systems, and/or methods of any of the other independent claims.

DETAILED DESCRIPTION

Figure 1:
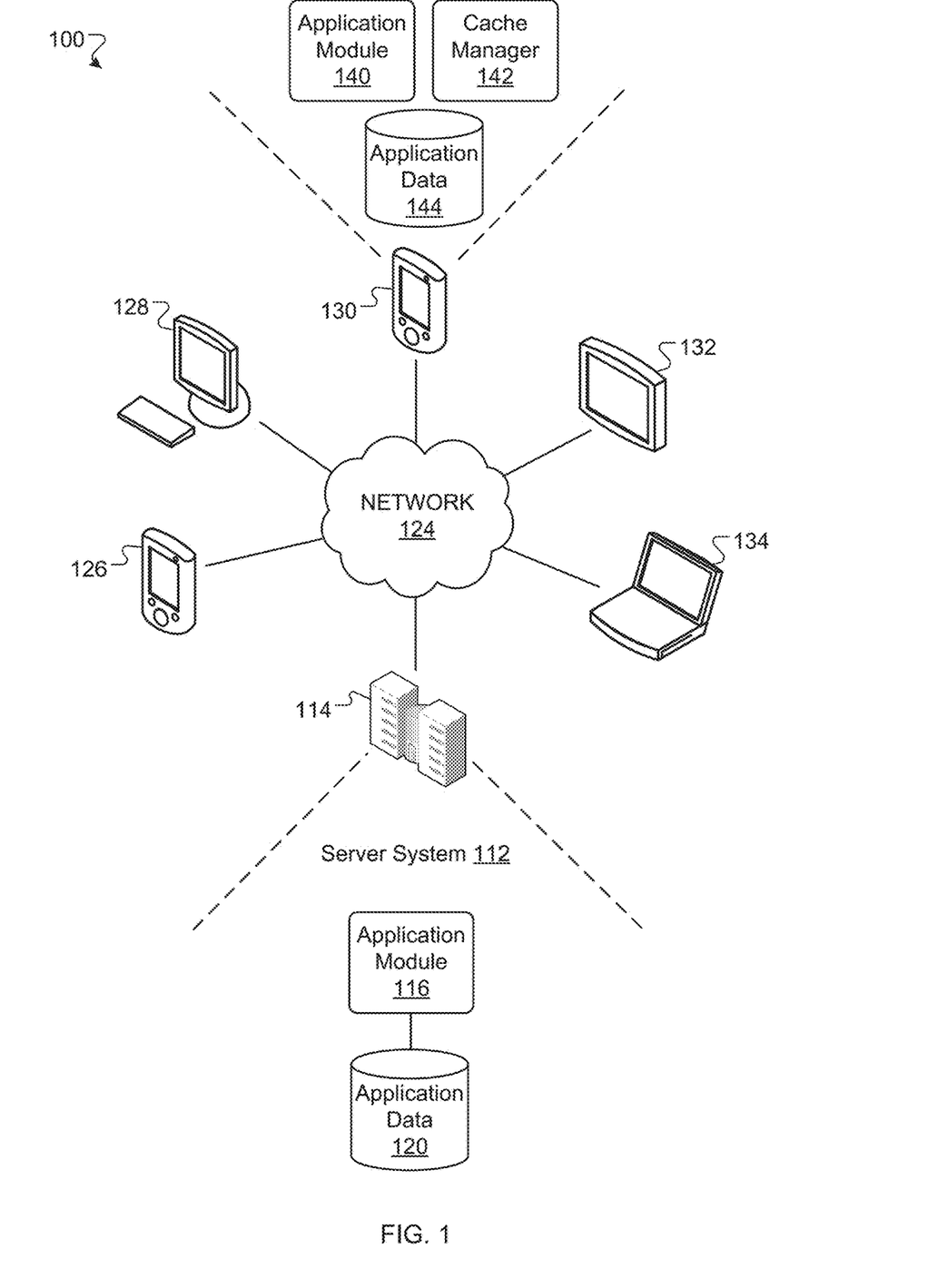
FIG. 1 is a schematic diagram of an example system for managing a file cache for a client application.

FIG. 1 illustrates an example system 100 for managing file caches for a client application (e.g., a software application running on a client device). A server system 112 provides functionality for initializing the client application and providing the client application to a plurality of users. The server system 112 includes software components and databases that can be deployed at one or more data centers 114 in one or more geographic locations, for example. In certain instances, the server system 112 is, includes, or utilizes a content delivery network (CDN). The server system 112 software components can include an application module 116 and/or can include subcomponents that can execute on the same or on different individual data processing apparatus. The server system 112 databases can include an application data 120 database. The databases can reside in one or more physical storage systems. The software components and data will be further described below.

The client application can be provided as an end-user application to allow users to interact with the server system 112. The client application or components thereof can be accessed through a network 124 (e.g., the Internet) by users of client devices, such as a smart phone 126, a personal computer 128, a smart phone 130, a tablet computer 132, and a laptop computer 134. Other client devices are possible.

Each client device in the system 100 can utilize or include software components and databases for the client application. The software components on the client devices can include an application module 140 and a cache manager 142. The application module 140 can implement the client application on each client device. The cache manager 142 can be used to manage a file cache for the client application, as described herein. The databases on the client devices can include an application data 144 database, which can include the file cache and can exchange files and/or data with the application module 140 and/or the cache manager 142. The files and/or data stored on the application data 144 database can include, for example, startup files, runtime files, user data, image data, video data, and any other files or data used or generated by the application module 140 and/or the cache manager 142. While the application module 140, the cache manager 142, and the application data 144 database are depicted as being associated with the smart phone 130, it is understood that other client devices (e.g., the smart phone 126, the personal computer 128, the tablet computer 132, and/or the laptop computer 134) can include the application module 140, the cache manager 142, the application data 144 database, and any portions thereof.

Still referring to FIG. 1, the application module 116 can include software components that support the client application by, for example, performing calculations, implementing software updates, exchanging information or data with the application module 140 and/or the cache manager 142, assisting with the initialization of the client application, and/or monitoring an overall status of the client application. The application data 120 database can store and provide files and/or data for the client application. The files and/or data can include, for example, startup files, runtime files, user data, image data, video data, lists of files, and/or any other files or data that can be used by the server system 112 and/or client devices to run the client application. In certain instances, for example, the application module 116 can retrieve files or data (e.g., video data or image data) from the application data 120 database and send the data to client devices during a startup phase and/or a runtime phase of the client application.

The client application implemented on the client devices 126, 128, 130, 132, and 134 can relate to and/or provide a wide variety of functions and information, including, for example, entertainment (e.g., a game, music, videos, etc.), business (e.g., word processing, accounting, spreadsheets, etc.), news, weather, finance, sports, etc. In certain instances, the client application provides a multi-player online game.

In certain examples, a "run" of the client application can refer to a session in which the client application is being used on a client device. A run can begin when the client application is launched and can end when the client application is closed or no longer being used.

In general, the system 100 and related methods can be used to manage a cache of files on a client device (e.g., the client device 130) for the client application. Files that are used by the client application can be downloaded from the server system 112 and stored in a file cache on the client device (e.g., in the application data 144 database). When the client application needs to use a file that has already been downloaded and is stored in the file cache, the client application can access the file from the file cache, without having to download the file again from the server system 112. This can avoid unnecessary file downloads and can cause the client application to run more efficiently. In various examples, however, the file cache can grow to an unmanageable size, as more files are downloaded and used by the client device. To limit the size of the file cache, the cache manager 142 can remove files from the file cache, using various techniques.

In one approach, for example, the cache manager 142 can remove all files from the file cache each time the client application is initiated. Then later, during runtime, the server system 112 can send down a list of needed files to the client application on the client device. Each item in the list can include a source (e.g., a URL to a CDN location) and a destination (e.g., the local filename on the client application). The client application (e.g., using the cache manager 142) can then download each file from the CDN and write the file to a cache folder in the file cache, for example, in the application data 144 database. In preferred examples, the application data 144 database can include a separate cache folder for each CDN or server computer that provides files for the client application. When the file download is completed, the cache manager 142 can store the list of files in the application data 144 database. At any time during the run, any files that are needed and have already been downloaded can be read from the file cache rather than being downloaded again from the server system 112.

This approach of removing all cache files at startup can suffer from two problems. First, the client application can be delayed during startup as old files are deleted from the cache. Second, given that the cache is cleaned at the start of each new run, the cache can be useful only during a single run, and there is generally no advantage gained from having files in cache from previous runs.

In another approach, the client application can scan the file cache at startup and identify and delete any files in the cache that are older than some timestamp or threshold age, such as, for example, one week, two weeks, or more. A list of files in the cache can be stored in the application data 144 database and revised, as appropriate, as files are added or removed from the cache. As with the previous approach, the client manager 142 can retrieve files from the file cache, if present, or download the files, if not present.

This approach of deleting files that are older than a threshold age can be problematic for a few reasons. When the clock setting on a client device is inaccurate or spoofed, for example, an apparent write time or a time of last access for files can be unreliable, compared with a current reported time. Additionally or alternatively, because file timestamps can be system dependent and/or outside of the control of the client application or cache manager 142, it is generally preferable to avoid the use of timestamps. Further, in the case of a client application that contains a large amount of old or obsolete files, this timestamp approach can result in a large amount of time being spent deleting the old or obsolete files. Additionally or alternatively, when a client application has not been run for more than the threshold amount of time, then deleting the older files may be more aggressive than is optimal.

Accordingly, in preferred examples, the cache manager 142 can retain files in the cache from a previous run for use in a subsequent run and/or does not need to rely on timestamps for removing files from the file cache. The cache manager 142 can, for example, retain any files in the cache that were (i) used or considered important during a recent run (e.g., the immediately preceding run) and/or (ii) that may or will be used during a current or subsequent run. Other files (e.g., that were not used during the recent run or will not be used during the current run) can be removed from the file cache during the current run, preferably up to some maximum or threshold number of files.

Figure 2:
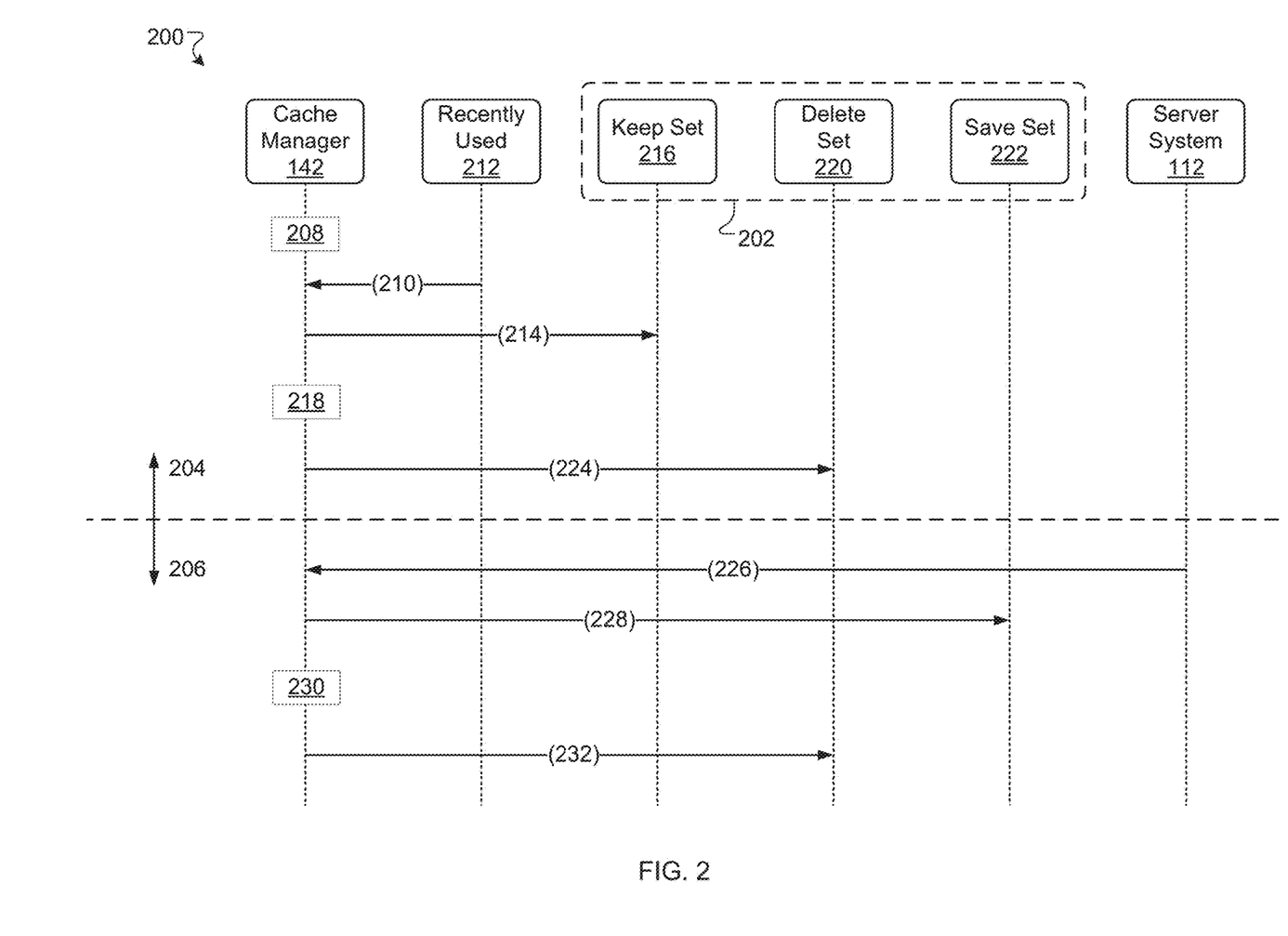
FIG. 2 is a data flow diagram of an example method of managing a file cache for a client application.

For example, FIG. 2 is a data flow diagram for an example method 200 of managing a file cache 202 during a startup phase 204 and a runtime phase 206 for a client application. During the startup phase 204, an instance of the cache manager 142 can be created (step 208) for each cache folder stored in file cache 202. There is generally no practical limit to the number of cache folders that can be created and/or used. Any such limit can depend on, for example, available disk space and/or memory resources of the client device on which the client application and/or the cache manager 142 are running. For example, multiple cache folders may be desirable or necessary when there are multiple different sources of downloadable files. In such a case, a number of cache folders can be equal to a number of download sources. In general, one to three (e.g., two) cache folders can be sufficient for many client applications. Each cache manager 142 can be assigned at runtime to manage a specific cache folder. The names and/or locations of the cache folder can be predefined in the same manner that folders and/or filenames can be predefined. For example, if it is known that files are to be cached from two network sources, such as, for example, an "events" source and a "CDN" source, then the corresponding cache folders to be created could be: <application-data>/cache/events/ and <application-data>/cache/cdn/, respectively. If the cache folder does not exist at startup, the cache manager 142 can create the cache folder. Much of the following discussion of the method 200 relates to managing a file cache (e.g., the file cache 202) for a single cache folder. It is understood, however, that the method 200 can be used to manage any number of cache folders, for example, using a separate instance of the cache manager 142 for each cache folder or a single cache manager 142 for multiple cache folders. Additionally or alternatively, the file cache 202 can include more than one cache folder and/or can include no cache folders, in which case the cache manager 142 can manage the file cache 202 without referencing or using any cache folders.

Next, the cache manager 142 for a given cache folder can look for and load (step 210) a recently used file 212 from the file cache 202. The recently used file 212 was preferably written to memory by the cache manager 142 during a previous run (e.g., an immediately preceding run) or group of runs (e.g., the immediately preceding two or three runs) of the client application. The recently used file 212 can include a list of filenames (and/or folder names) that were used or otherwise considered important during the previous run (or runs). The files listed in the recently used file 212 can then be assigned (step 214) to a keep set 216 in memory. In general, files and folders in the keep set 216 will be retained in the file cache 202 (e.g., not deleted) during the current run of the client application. In the case of folders, the folders can be treated atomically and kept or deleted as a whole. The keep set 216 can alternatively be referred to herein as a "first portion" of files in the file cache 202.

Figure 3:
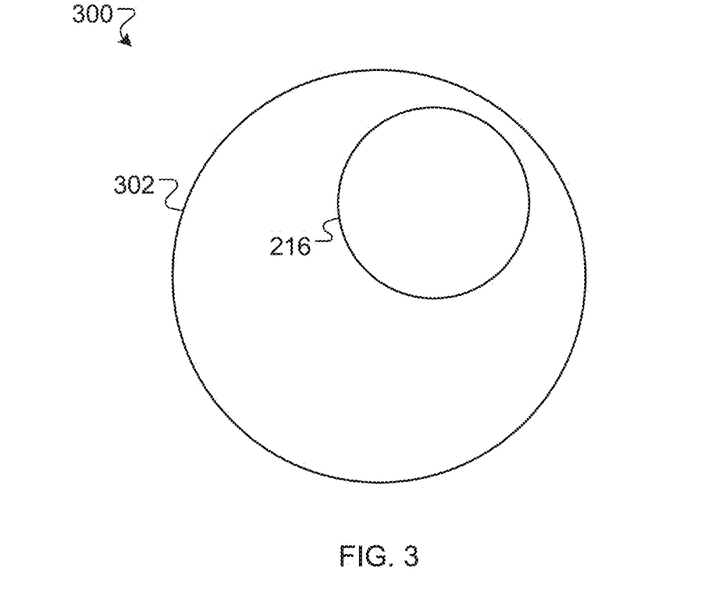
FIGS. 3 and 4 are Euler diagrams of collections of files for a client application, in accordance with certain examples of this disclosure.

For purposes of illustration and not limitation, FIG. 3 includes an Euler diagram 300 showing an initial collection of files 302 stored in the file cache 202 during the startup phase 204. The recently used file 212 identifies a portion of these files 302 as belonging to the keep set 216.

In some instances, if the recently used file 212 does not exist (e.g., the file has been lost or corrupted), the cache manager 142 may not be able to identify files that were used or considered important during a previous run and/or may remove such files from cache, even though the files may have a good chance of being requested or used again in the current or future runs. The recently used file 212 can be created and stored for a subsequent run, however, so any loss or corruption of the recently used file 212 can be temporary and cause little to no disruption in performance. Additionally or alternatively, the recently used file 212 can be given a name that does not conflict with any names of files or folders in the file cache 202. The name of the recently used file 212 can start with an underscore or use an extension that is known to be different from any file that may be downloaded. Other ways of differentiating the name of the recently used file 212 from the names of other files or folders are possible.

Referring again to FIG. 2, the cache manager 142 can create (step 218) a new empty delete set 220 and a new empty save set 222 in memory. In general, files in the delete set 220 will be removed from the file cache 202 during the current run, and files in the save set 222 can be used and/or considered important for the current run. The cache manager 142 can then determine the current contents of the file cache 202 and add (step 224) to the delete set 220 any files in the file cache 202 that are not in the keep set 216. The delete set 220 can alternatively be referred to herein as a "second portion" of files in the file cache 202. To retain the recently used file 212, the recently used file 212 can be added to the keep set 216 and/or can be stored outside of the file cache 202. In general, the cache manager 142 can continue to run until the client application shuts down or is otherwise closed or exited by the user.

Following the startup phase 204 of the client application, the cache manager 142 can proceed as follows during the runtime phase 206. First, the server system 112 (e.g., using the application module 116) can send (step 226) one or more lists of files to the cache manager 142 and/or to the client application (e.g., the application module 140). The lists of files can identify files that the server system 112 wants the client application to use during the runtime phase 206. Each time a list is received and preferably before that list is acted upon by the client application, the cache manager 142 can add (step 228) each file (or folder) in the list to the save set 222. If the file is presently in the delete set 220, the file can be removed (step 230) from the delete set 220. The accumulated save set 222 can be written into the file cache 202 as the new recently used file 212. For example, at the end of the current run, the files and/or folders listed in the recently used file 212 can be identical to the files and/or folders included in the save set 222.

Figure 4:
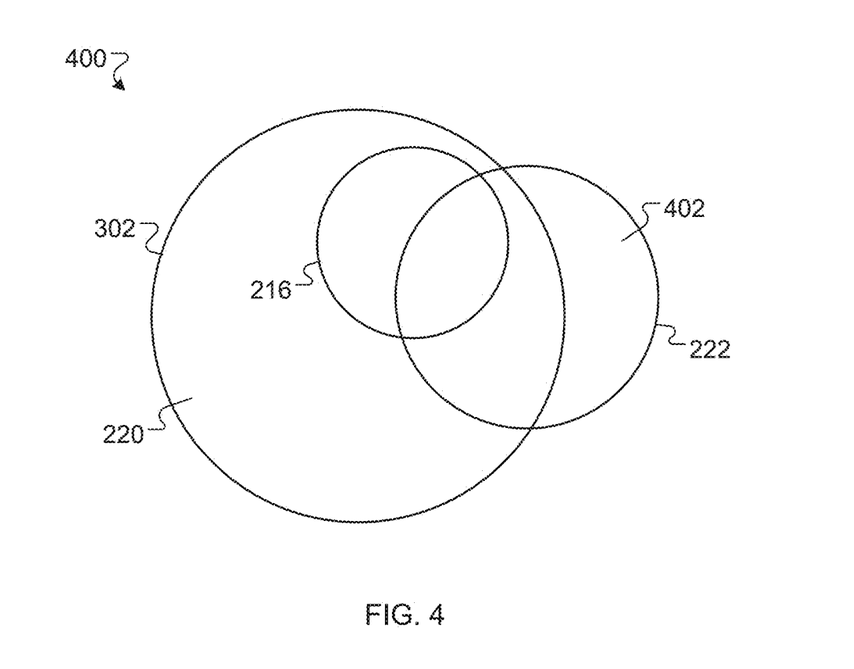

For purposes of illustration and not limitation, FIG. 4 includes an Euler diagram 400 showing various groupings of files that are stored in the file cache 202 and/or used by the client application during the runtime phase 206. The groupings include the initial collection of files 302 and the keep set 216 from the startup phase 204. The groupings also include the save set 222 of files identified in the one or more lists received from the server system 112. In various examples, files in the file cache 202 that reside in the keep set 216 and/or the save set 222 can be retained in the file cache 202 (e.g., not deleted) during the current run of the client application. Files in the file cache 202 that are not in the keep set 216 or the save set 222 can be assigned to the delete set 220. Files in the delete set 220 can be removed from the file cache 202 during the current run using a clean operation, as described herein.

Referring again to FIG. 2, the cache manager 142 can obtain (step 230) for the client application each file identified in the one or more lists from the server system 112 (e.g., in the save set 222). If the cache manager 142 can locate the file in the file cache 202, then the file can be retrieved from memory and does not need to be downloaded. Alternatively, if the file cannot be found in the file cache 202, the cache manager 142 can download the file from the server system 112. Files in the save set 222 that are not in the initial collection of files 302 (e.g., in the file cache 202) and are downloaded can be referred to as download files 402, as shown in FIG. 4.

Referring again to FIG. 2, after some appropriate amount of time, the cache manager 142 can perform (step 232) a clean operation in which files in the delete set 220 are removed from the file cache 202. In preferred examples, the clean operation can be started or performed once per run, for example, at a certain time (e.g., 30 seconds or one minute) after the client application has launched, or at any other suitable time. Waiting to start the clean operation until after the client application has launched can make launching the client application more efficient and avoid unnecessary delays at that time. Alternatively, the clean operation can be started more than once per run and/or can be performed according to an activity level of the client application (e.g., based on CPU usage). For example, the clean operation can be started during a period of low activity and then stopped when a period of high activity is encountered. The clean operation can be started again later when the activity drops below a specified threshold level. In general, however, it is preferable to start the clean operation once per run.

During the clean operation, the cache manager 142 can remove files from the file cache 202 that belong to the delete set 220. The cache manager 142 can, in some instances, remove all files that belong to the delete set 220. Alternatively or additionally, the cache manager 142 can remove files up to a predetermined maximum number of files, after which no further files are removed during the current run. The maximum is generally less than or equal to a total number of files in the delete set 220. The maximum can be, for example, a value that is equal to or larger (e.g., 10% or 20% larger) than an average number of files downloaded to the file cache 202 during an average run of the client application. This can cause the clean operation to decrease a size of the file cache 202 over time. In one example, the maximum can be a number of files in the keep set 216 or the save set 222, whichever is larger, plus a suitable constant. The constant can be, for example, about 10% or 20% of the number of files in the keep set 216 or the save set 222. Other methods of determining the maximum number of files to delete are possible. An advantage of not deleting too many files is that retaining extra files can allow for more cache hits in the future, thereby avoiding repetitive downloads. To remove the files, the cache manager 142 can walk through the delete set 220 (e.g., in no particular order) up to the maximum number. The items removed can be or include files and/or folders.

In various examples, the cache manager 142 and/or the client application can perform one or more of the steps described herein in multiple parallel threads, which can involve using suitable thread safety techniques, such as locks around particular memory and disk operations and the like. For example, the clean operation can be performed in a separate thread to minimize any noticeable delays on the client application or an interruption in a frame rate of the client application. In general, however, the various steps described herein can be implemented using either single or multi-threaded techniques.

Figure 5:
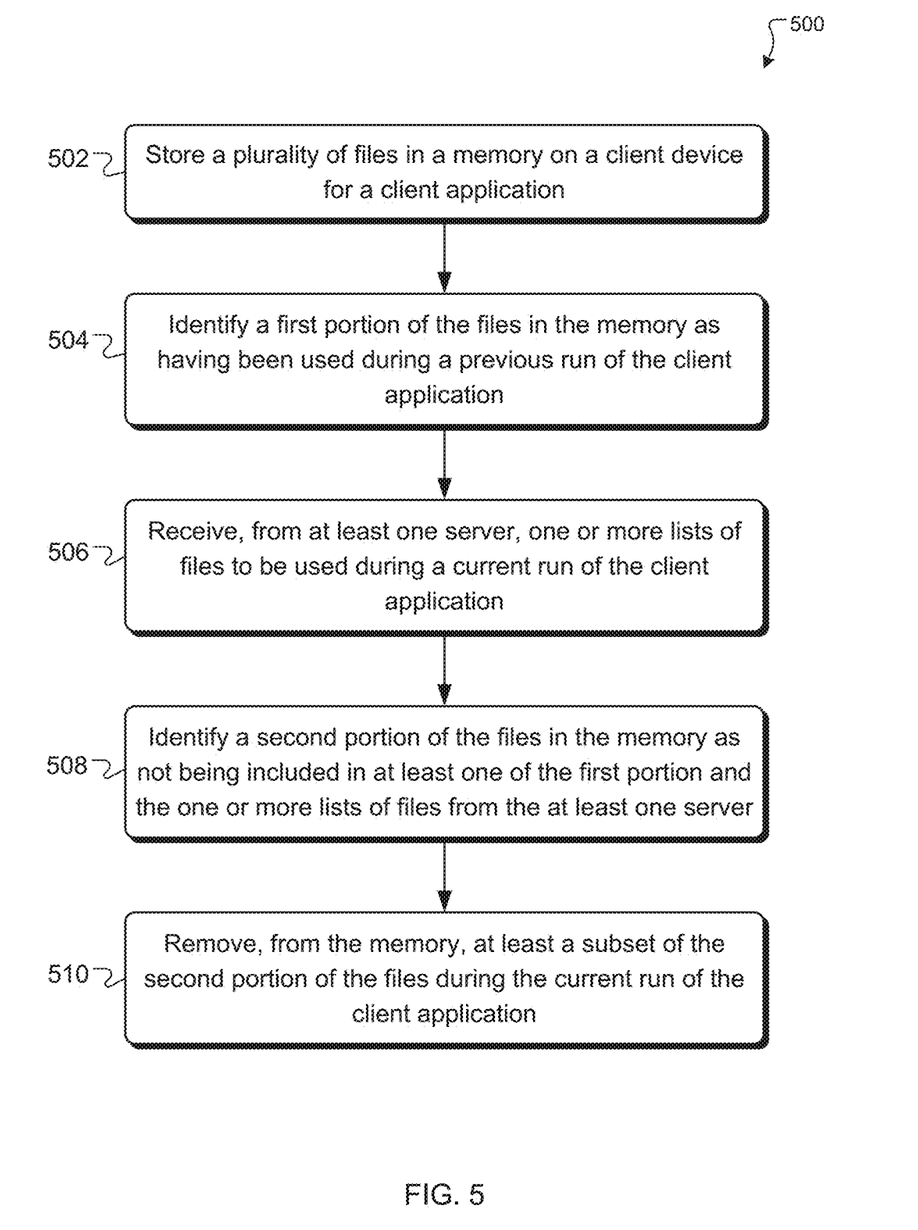
FIG. 5 is a flowchart of an example method of managing a file cache for a client application.

FIG. 5 illustrates an example computer-implemented method 500 of managing a file cache for a client application.

A plurality of files is stored (step 502) in a memory on a client device for a client application. A first portion of the files in the memory is identified (step 504) as having been used during a previous run of the client application. One or more lists of files to be used during a current run of the client application are received (step 506) from at least one server. A second portion of the files in the memory is identified (step 508) as not being included in at least one of the first portion and the one or more lists of files from the at least one server. At least a subset of the second portion of the files is removed (step 510) from the memory during the current run of the client application.

In preferred implementations, an information package, such as, for example, data, images, and/or other files for features or events, can be chosen by the server system 112 for delivery to the client application at specific times, including around initial login time. Such information packages can include a number of files, some of which can be large and/or slow to download. The client application is preferably able to display these information packages as soon as possible.

Advantageously, the systems and methods described herein can use the cache from previous runs to avoid repeated downloads of the same files. Files for an information package might be unique to, for example, a particular feature or event, or might be reused from other features or events (e.g., for an online game or other client application). An information package downloaded on one run of the client application might be requested again in the near future. Within a timespan of a few days or a week, it can be likely that a feature or event from the server system 112 will repeat, and much more likely that certain individual files will be repeated.

The systems and methods described herein are able to achieve an advantage in speed and online bandwidth by storing such files in a cache (e.g., the file cache 202) after downloading for the first time. Consequently, instead of downloading a file a second time, the file can be found in the cache and the download step can be skipped. Over time, however, the cache can grow larger, full of more and more files, many of which as they age may never be needed again.

Leaving such files in the cache can cause several problems. For example, storage space used by the client application can grow without bound. Also, as the cache grows larger, scanning the cache for files can become a more expensive operation. The systems and methods described herein can avoid such problems by performing the clean operation.

In some instances, a different type of file cache may have been used previously in a prior version of the client application, for example, in an unsophisticated or unoptimized manner. In such older versions, the cache may have been written to, but never cleaned, so that there may be many megabytes in many thousands of old unused files in the cache. Advantageously, once implemented, the clean operation associated with the systems and methods described herein can efficiently remove old files that have accumulated in the file cache.

Additionally, an older version of the client application may have used a single cache and/or a single cache folder to store files for the client application. When the approach described herein is implemented, however, the original cache from the older version of the client application can continue to be used, for example, as a cache for top level information files. A second cache can be created and used, for example, for supplemental files that are downloaded from a different location (e.g., a different server computer).

Such supplemental files can generally follow a different lifespan and/or can have a higher rate of reuse. By storing and managing files in multiple caches and/or cache folders (e.g., each assigned to a different server computer or CDN), the systems and methods described herein can generally provide a better fit and/or a more efficient cache management scheme. Each cache can be managed separately, for example, using a separate cache manager 142, which can save files for later use and remove old files, as described herein.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method, comprising:
   storing a plurality of files in a memory on a client device for a client application;
   identifying a first portion of the files in the memory as having been used during an immediately preceding run of the client application;
   receiving, from at least one server, one or more lists of files to be used during a current run of the client application;
   identifying a second portion of the files in the memory as not being included in at least one of the first portion and the one or more lists of files from the at least one server; and
   removing, from the memory, at least a subset of the second portion of the files during the current run of the client application.

2. The method of claim 1, wherein the plurality of files is stored in at least one cache folder, and wherein each cache folder in the at least one cache folder corresponds to a respective server in the at least one server.

3. The method of claim 1, wherein identifying the first portion comprises:
   retrieving, from the memory, a history file that lists the files used during the immediately preceding run.

4. The method of claim 3, further comprising:
   updating the history file to list the files used during the current run of the client application.

5. The method of claim 4, further comprising:
   using the updated history file to identify the first portion of the files during a subsequent run of the client application.

6. The method of claim 1, wherein the second portion comprises files that were not used during the immediately preceding run and will not be used during the current run.

7. The method of claim 1, wherein removing from the memory comprises:
   deleting files from the memory up to a predetermined maximum number of files, wherein the maximum number is less than or equal to a number of files included in the second portion.

8. The method of claim 1, further comprising:
   obtaining each file identified in the one or more lists of files for use during the current run of the client application.

9. The method of claim 8, wherein obtaining each file comprises determining if the file is stored in the memory.

10. The method of claim 9, wherein obtaining each file comprises one of:
    retrieving the file from the memory if the file is stored in the memory; and
    downloading the file from the at least one server if the file is not stored in the memory.

11. A system, comprising:
    one or more computer processors programmed to perform operations comprising:
    storing a plurality of files in a memory on a client device for a client application;
    identifying a first portion of the files in the memory as having been used during an immediately preceding run of the client application;
    receiving, from at least one server, one or more lists of files to be used during a current run of the client application;
    identifying a second portion of the files in the memory as not being included in at least one of the first portion and the one or more lists of files from the at least one server; and
    removing, from the memory, at least a subset of the second portion of the files during the current run of the client application.

12. The system of claim 11, wherein the plurality of files is stored in at least one cache folder, and wherein each cache folder in the at least one cache folder corresponds to a respective server in the at least one server.

13. The system of claim 11, wherein identifying the first portion comprises:
    retrieving, from the memory, a history file that lists the files used during the immediately preceding run.

14. The system of claim 13, the operations further comprising:
    updating the history file to list the files used during the current run of the client application.

15. The system of claim 11, wherein the second portion comprises files that were not used during the immediately preceding run and will not be used during the current run.

16. The system of claim 11, wherein removing from the memory comprises:
    deleting files from the memory up to a predetermined maximum number of files, wherein the maximum number is less than or equal to a number of files included in the second portion.

17. The system of claim 11, the operations further comprising:
    obtaining each file identified in the one or more lists of files for use during the current run of the client application.

18. The system of claim 17, wherein obtaining each file comprises determining if the file is stored in the memory.

19. The system of claim 18, wherein obtaining each file comprises one of:
    retrieving the file from the memory if the file is stored in the memory; and
    downloading the file from the at least one server if the file is not stored in the memory.

20. An article, comprising:
    a non-transitory computer-readable medium having instructions stored thereon that, when executed by one or more computer processors, cause the computer processors to perform operations comprising:
    storing a plurality of files in a memory on a client device for a client application;
    identifying a first portion of the files in the memory as having been used during an immediately preceding run of the client application;
    receiving, from at least one server, one or more lists of files to be used during a current run of the client application;
    identifying a second portion of the files in the memory as not being included in at least one of the first portion and the one or more lists of files from the at least one server; and
    removing, from the memory, at least a subset of the second portion of the files during the current run of the client application.

* * * * *